(12) United States Patent
Calkins

(10) Patent No.: US 8,880,333 B2
(45) Date of Patent: Nov. 4, 2014

(54) EFFECTIVE SLOPE FOR FUEL CONSUMPTION CALCULATION

(75) Inventor: Andrew Calkins, Naperville, IL (US)

(73) Assignee: HERE Global B.V., Veldhoven (NL)

( * ) Notice: Subject to any disclaimer, the term of this patent is extended or adjusted under 35 U.S.C. 154(b) by 969 days.

(21) Appl. No.: 12/917,770

(22) Filed: Nov. 2, 2010

(65) Prior Publication Data

US 2012/0109512 A1    May 3, 2012

(51) Int. Cl.
*G01C 21/00* (2006.01)
*G01C 21/36* (2006.01)
*G01C 21/34* (2006.01)

(52) U.S. Cl.
CPC .................................. *G01C 21/3469* (2013.01)
USPC ......................................... 701/410; 701/533

(58) Field of Classification Search
CPC .... G01C 21/26; G01C 21/34; G01C 21/3446; G01C 21/36; G01C 21/00
USPC ......... 701/201, 410, 411, 420, 421, 425, 429, 701/527, 533, 538, 209, 210, 439, 123; 340/995.13, 995.19, 995.23, 995.27
See application file for complete search history.

(56) References Cited

U.S. PATENT DOCUMENTS

| | | | | |
|---|---|---|---|---|
| 5,742,922 A | | 4/1998 | Kim | 701/201 |
| 5,913,917 A | | 6/1999 | Murphy | 701/123 |
| 6,005,494 A | | 12/1999 | Schramm | 340/995 |
| 7,219,539 B1 | * | 5/2007 | Bauerle | 73/114.54 |
| 7,715,961 B1 | * | 5/2010 | Kargupta | 701/29.3 |
| 8,135,538 B2 | * | 3/2012 | Geelen et al. | 701/438 |
| 8,175,795 B2 | * | 5/2012 | Narita et al. | 701/410 |
| 2010/0042453 A1 | * | 2/2010 | Scaramellino et al. | 705/7 |
| 2010/0049397 A1 | | 2/2010 | Liu et al. | |
| 2010/0250059 A1 | * | 9/2010 | Sekiyama et al. | 701/35 |
| 2011/0106427 A1 | * | 5/2011 | Kim et al. | 701/201 |
| 2011/0184642 A1 | * | 7/2011 | Rotz et al. | 701/201 |
| 2011/0246004 A1 | * | 10/2011 | Mineta | 701/22 |
| 2012/0010781 A1 | * | 1/2012 | Suyama et al. | 701/37 |
| 2012/0029803 A1 | * | 2/2012 | Yasushi et al. | 701/123 |

FOREIGN PATENT DOCUMENTS

EP    2136182 A1    12/2009
JP    H01094035    *    4/1989

OTHER PUBLICATIONS

Chirs Manzie et al., "Fuel economy improvements for urban driving: Hybrid vs. intelligent vehicles", 2007, www.ScienceDirect.com.*

* cited by examiner

*Primary Examiner* — Mary Cheung
*Assistant Examiner* — Rodney Butler
(74) *Attorney, Agent, or Firm* — Lempia Summerfield Katz LLC

(57) ABSTRACT

A method and system for calculating a green route using an effective slope is disclosed. A route calculation application calculates one or more routes from an origin to a destination. For each of the routes, the route calculation application calculates an associated fuel consumption value. The fuel consumption value is based on effective slope for segments in the route. The effective slope is a value that is based on the impact slope has on the fuel consumption of a vehicle traveling on the segment.

21 Claims, 5 Drawing Sheets

EFFECTIVE SLOPE FOR FUEL CONSUMPTION CALCULATION

FIELD

The present invention relates generally to green routing, and more particularly, relates to using an effective slope value when calculating fuel consumption.

BACKGROUND

Navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a GPS system), the navigation system can examine various potential routes between the origin and destination locations to determine the optimum route.

The navigation system may then provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. Roads in the geographic region may be represented in the geographic database with one or more road segments. Each road segment is associated with two nodes; one node represents the point at one end of the road segment and the other node represents the point at the other end of the road segment. Alternatively, roads may be represented with curves, such as spline, Bezier, and clothoid curves.

The geographic database also includes information about the represented roads, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. For example, some navigation systems calculate routes to minimize the vehicle's $CO_2$ emissions. Such a route is sometimes referred to as a "green route." There are many factors that determine a vehicle's fuel consumption as the vehicle travels along a particular route. These factors include speed of travel, traffic light and sign locations, weather, and road surface type, slope, and curvature.

To calculate a green route, the navigation system uses a route calculation algorithm, such as the A* search algorithm. Prior to calculating a route, a cost is assigned to the road segments or curves stored in the geographic database. For green routing, the cost is based on the road properties of the represented road and how these road properties impact fuel consumption. The route calculation algorithm evaluates different possible routes from an origin to a destination and identifies the route with the least cost.

SUMMARY

A method and system for calculating a green route using an effective slope value is disclosed. The method includes obtaining an origin and a destination associated with a road network and calculating at least one route from the origin to the destination using geographic data representing roads in the road network. The geographic data includes effective slope data that represents a fuel consumption impact of a slope of a road. The method further includes calculating fuel consumption of the calculated routes using the effective slope data to identify a route that minimizes fuel consumption when traveling from the origin to the destination. The method then provides route guidance for traveling on the route that minimizes fuel consumption.

The system includes a user interface that allows a user to request route information from a first location to a second location and a map database that includes geographic data for a geographic area that includes the first and second locations. The geographic database includes effective slope data that represents a fuel consumption impact of actual slope. The system also includes a processor that executes a route calculation application that calculates a route that minimizes fuel consumption when traveling from the first location to the second location. The route is calculated using the effective slope data.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

I. Navigation System

Figure 1:
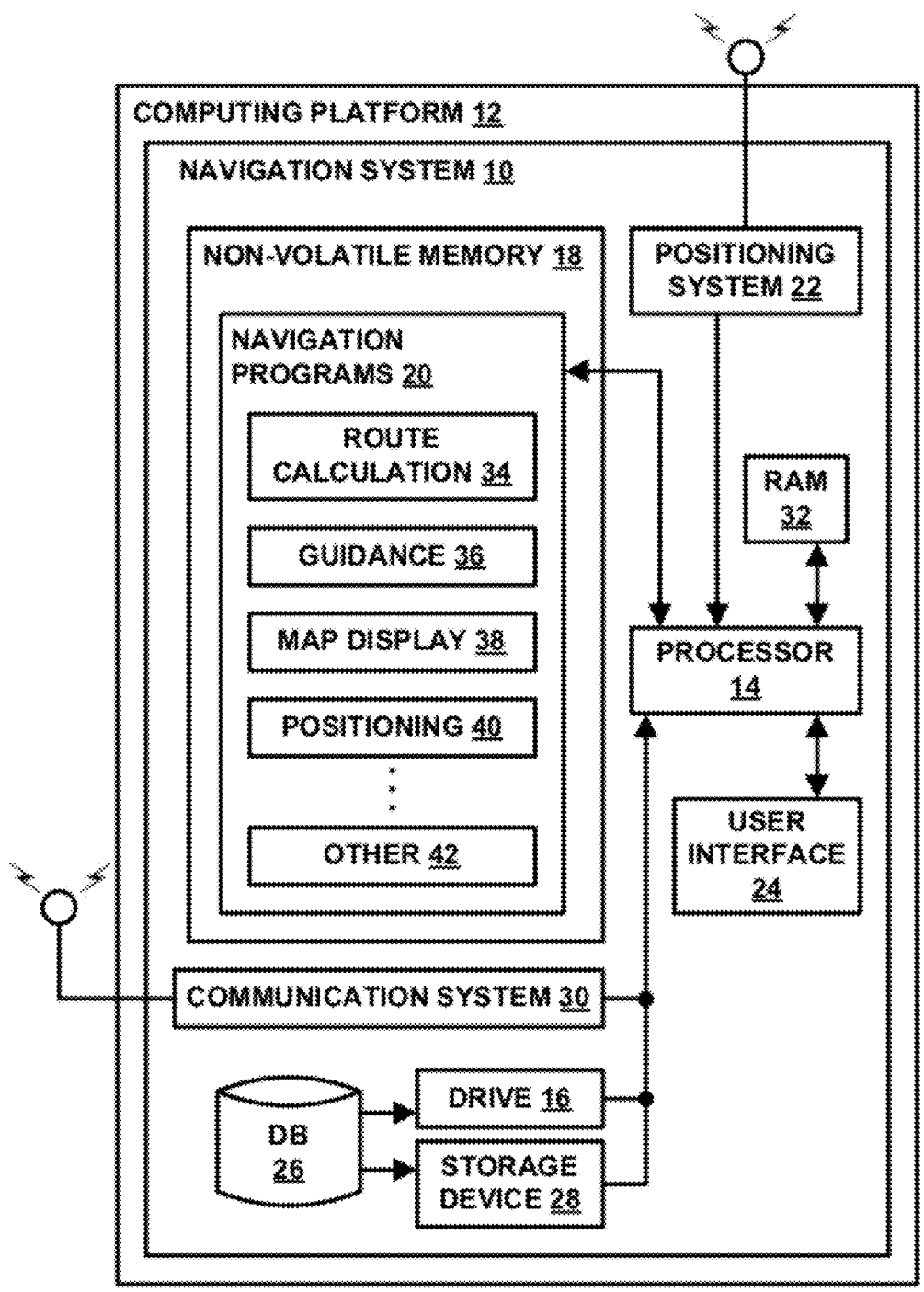
FIG. 1 is a block diagram of a navigation system, according to an example.

FIG. 1 is a block diagram of a navigation system 10 associated with a computing platform 12. The computing platform 12 may be associated with a vehicle. Additionally, the computing platform 12 may be a personal digital assistant (PDA), mobile telephone, personal computer, or any other computer. The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information.

The navigation system 10 also includes a positioning system 22. The positioning system 22 may utilize GPS-type technology, a dead reckoning-type system, or combinations of these or other systems, which are known in the art. The positioning system 22 may include suitable sensing devices that measure the traveling distance speed, direction, orientation, and so on. The positioning system 22 may also include a GPS system. The positioning system 22 outputs a signal to the processor 14. The navigation application software programs 20 that run on the processor 14 use the signal from the positioning system 22 to determine the location, direction, orientation, etc., of the computing platform 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26.

In one embodiment, the geographic database 26 is stored on a storage medium, such as a CD-ROM or DVD, that is installed in the drive 16 so that the geographic database 26 can be read and used by the navigation system 10. In one embodiment, the navigation system 10 also includes a storage device 28, such as a hard disk or memory card, on which a portion or the entire geographic database 26 is stored. In one embodiment, the geographic database 26 may be a geographic database published by NAVTEQ North America, LLC of Chicago, Ill.

The geographic database 26 does not have to be physically provided at the location of the navigation system 10. In alternative embodiments, some or the entire geographic database 26 may be located remotely from the rest of the navigation system 10 and portions of the geographic data provided via a communications system 30, as needed.

In one exemplary type of system, the navigation application software programs 20 load from the non-volatile memory storage device 18 into a random access memory (RAM) 32 associated with the processor 14. The processor 14 also receives input from the user interface 24. The navigation system 10 uses the geographic database 26 stored on the storage medium and/or storage device 28, possibly in conjunction with the outputs from the positioning system 22 and the communications system 30, to provide various navigation features and functions.

The navigation application software programs 20 may include separate applications (or subprograms) that provide the various navigation-related features and functions. The navigation functions and features may include route calculation 34 (wherein a route from an origin to a destination is determined), route guidance 36 (wherein detailed directions are provided for reaching a desired destination), map display 38, and positioning 40 (e.g., map matching). Other functions and programming 42 may be included in the navigation system 10.

The navigation application software programs 20 may be written in a suitable computer programming language such as C, although other programming languages, such as C++ or Java, are also suitable. All of the components described above may be conventional (or other than conventional) and the manufacture and use of these components are known to those of skill in the art.

II. Geographic Database

Figure 2:
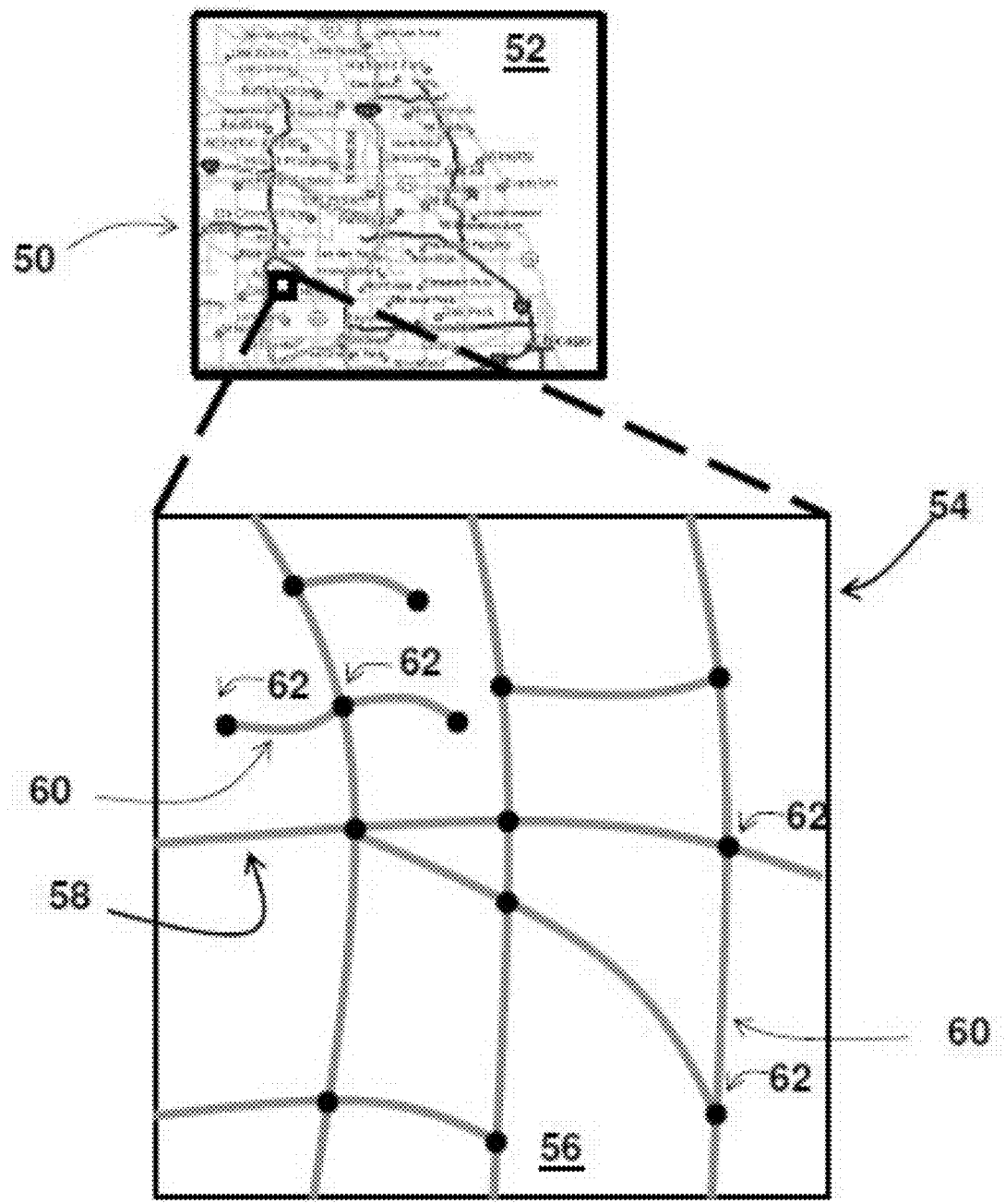
FIG. 2 shows a map of a geographic region, according to an example.

FIG. 2 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 2 also includes an enlarged map 54 of a portion 56 of the geographic region 52. The enlarged map 54 illustrates part of the road network 58 in the geographic region 52. The road network 58 includes, among other things, roads and intersections located in the geographic region 52. As shown in the portion 56, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 3:
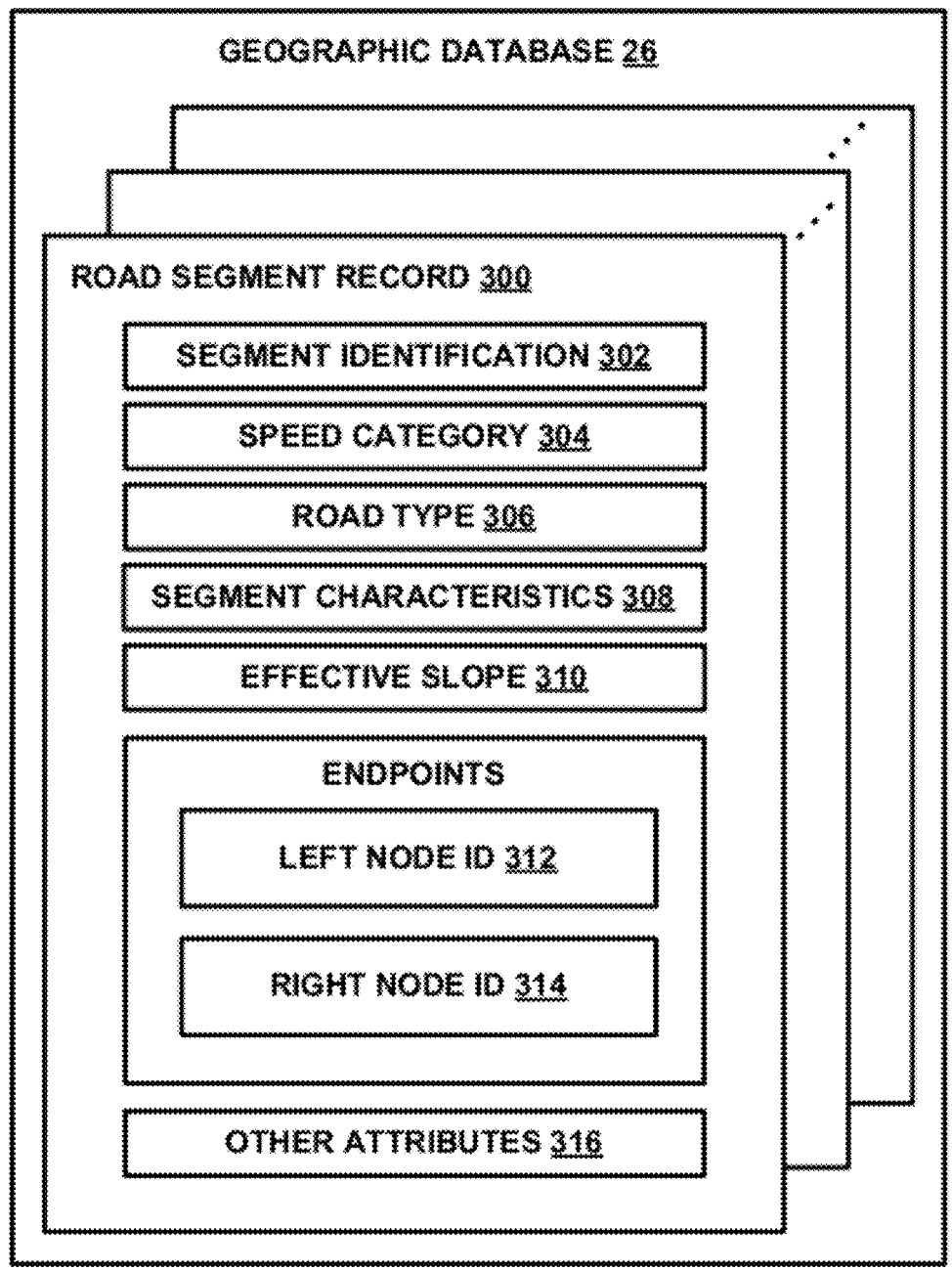
FIG. 3 is a block diagram of a geographic database that represents the geographic region of FIG. 2, according to an example.

FIG. 3 is a block diagram depicting of some of the data attributes for road segment data records 300 that may be found in the geographic database 26. The data attributes depicted in FIG. 3 include segment identification 302, speed category 304, road type 306, segment characteristics 308, and effective slope 310. The segment data attributes also include references to node data records in the form of node identification 312, 314 corresponding to endpoints of the segment. As this is not an exhaustive list of all the data attributes for the road segment data records, FIG. 3 also depicts other attributes 316.

The road segment data record 300 includes a segment ID 302 by which the data record can be identified in the geographic database 26. The segment ID 302 may be a numeric code, an alpha-numeric code, or any other string of numbers, letters, and/or symbols that can be used to identify the record.

The speed category attribute 304 represents the general speed trend of a road based on posted or implied speed limit. The speed category attribute 304 may contain data associated with the speed limit. Additionally or alternatively, the speed category attribute 304 may contain data associated with a speed range. For example, the speed category attribute 304 may include a data representation of the integer 1 for speeds exceeding 80 mph, the integer 2 for speeds in the range of 65-80 mph, the integer 3 for speeds in the range of 55-64 mph, and so on until the speed range includes 0 mph.

The road type attribute 306 represents the type of road the segment represents. For example, the road type attribute 306 may contain data associated with an interstate highway, a controlled access highway, a city street, a pedestrian walkway, and so on. For example, the road type attribute 306 may contain functional class data, which defines the road type.

The segment characteristic attribute 308 contains data that represent various characteristics of the segment. For example, the segment characteristic attribute 308 may identify whether a segment is a ramp, a bridge, a tunnel, a roundabout, and so on. The segment characteristic attribute 308 may also include data representing road surface type (e.g., concrete, asphalt, gravel) of the represented road segment. The segment characteristic attribute 308 may also include slope and/or curvature data for the segment.

The effective slope attribute 310 includes a value or code representing the effective slope of the segment. The effective slope of the segment represents a slope's contribution to fuel consumption when a vehicle drives on the segment. The effective slope attribute 310 is further described with reference to FIG. 4.

III. Effective Slope

Figure 4:
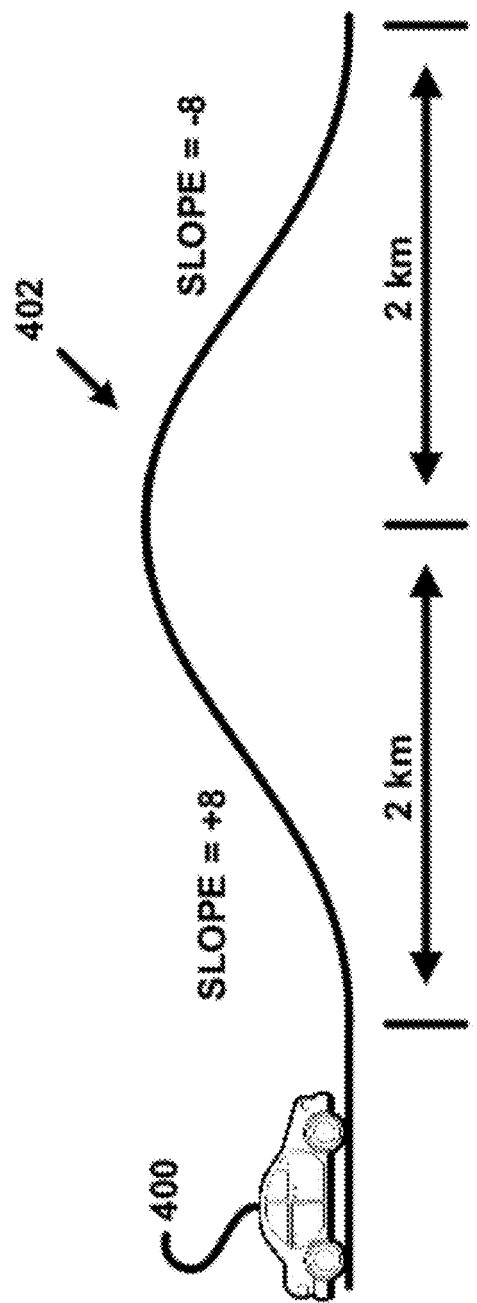
FIG. 4 depicts a vehicle traveling on a road, according to an example.

FIG. 4 depicts a vehicle 400 about to travel on a road 402. The road 402 has a hill. For simplicity's sake, the hill is shown to have a slope of 8% for the first 2 km of the road 402 and a slope of −8% for the second 2 km of the road 402. Thus, the road 402 has an average slope of 0%, indicating that the hill does not impact the fuel consumption of the vehicle 400 traveling over the road 402. However, the hill does impact fuel consumption.

Because the average slope of a road may not be representative of the impact of slope on fuel consumption, the effective slope attribute 310 includes a value that is based on the impact slope has on the fuel consumption of a vehicle traveling on the road 402. To determine effective slope, a general fuel consumption (GFC) value is calculated for road segment records 300 in the geographic database 26 that have slope values stored in the segment characteristic attribute 308. Using the effective slope value instead of the actual slope values reduces the complexity of the green routing calculation, which allows the green routing calculation to be a dynamic calculation, i.e., a calculation performed while the vehicle is in operation.

In one example, the GFC is calculated using the formula:

$$GFC = \Sigma(distance_n * LPK(slope_n))/\Sigma(distance_n) \quad \text{(Equation 1)}$$

where distance is the length of a segment, slope is the slope of the segment, and LPK is a lookup table value based on vehicle type preferably having the units of lp100 km (lp100 km=liters per 100 km).

To create the lookup table, fuel consumption ranges are clustered for different vehicle types. Clustering is a statistical analysis technique that analyzes the distribution of data over multiple dimensions and attempts to organize the data into "like" groupings. Other analytical techniques may be used to organize the fuel consumption data, such as Fuzzy c-means, hierarchical, Self Organizing Tree Algorithm (SOTA), and neural network approaches.

Table 1 provides an example output of the clustering results for a typical gasoline powered car. In this example, the results clustered around six slope values (i.e., −8, −4, 0, 4, 8, 12). However, the actual values and quantity of values may be different than those found in Table 1.

TABLE 1

| Slope | LPK |
|-------|------|
| −8    | 0.9  |
| −4    | 2.4  |
| 0     | 5.4  |
| 4     | 7.0  |
| 8     | 12.7 |
| 12    | 15.6 |

The number of slope values may vary based on the results of the clustering. However, by limiting the number of slope values, the complexity of the green routing calculation may be reduced. The number of slope values may be limited because a rough estimate of effective slope may be sufficient for the green routing calculation.

While Table 1 only has one LPK column, it is understood that different vehicle types may have different LPK values. For example, the table may have a column for trucks, a column for hybrids, a column for SUVs, and so on. Alternatively, there may be a separate table for different vehicle types so different slope values may be used in the table for different vehicles.

The LPK values for the different vehicle types may be obtained using clustering or another analytical analysis of fuel consumption values. Alternatively, the other LPK values may be derived from the first set of LPK values. For example, the LPK values for trucks may be derived from the LPK values of cars using a factor based on how much more fuel is consumed by a truck than a car on average.

Returning to the example depicted in FIG. 4, and using Equation 1 and Table 1, the GFC of the road 402 is GFC=((2 km*(12.7)(8))+(2 km*(0.9)(−8)))/4=6.8. The effective slope value is determined by performing a reverse lookup of the table. In the example depicted in FIG. 4, the effective slope value is 4%, which is associated with an LPK=7.0, the closest to the calculated value of GFC=6.8. The effective slope value of 4% is stored in the effective slope attribute 310 in the geographic database 26 for the segment that represents the road 402. A similar calculation is performed for the other road segments with available slope data in the geographic database 26.

IV. Route Calculation

Figure 5:
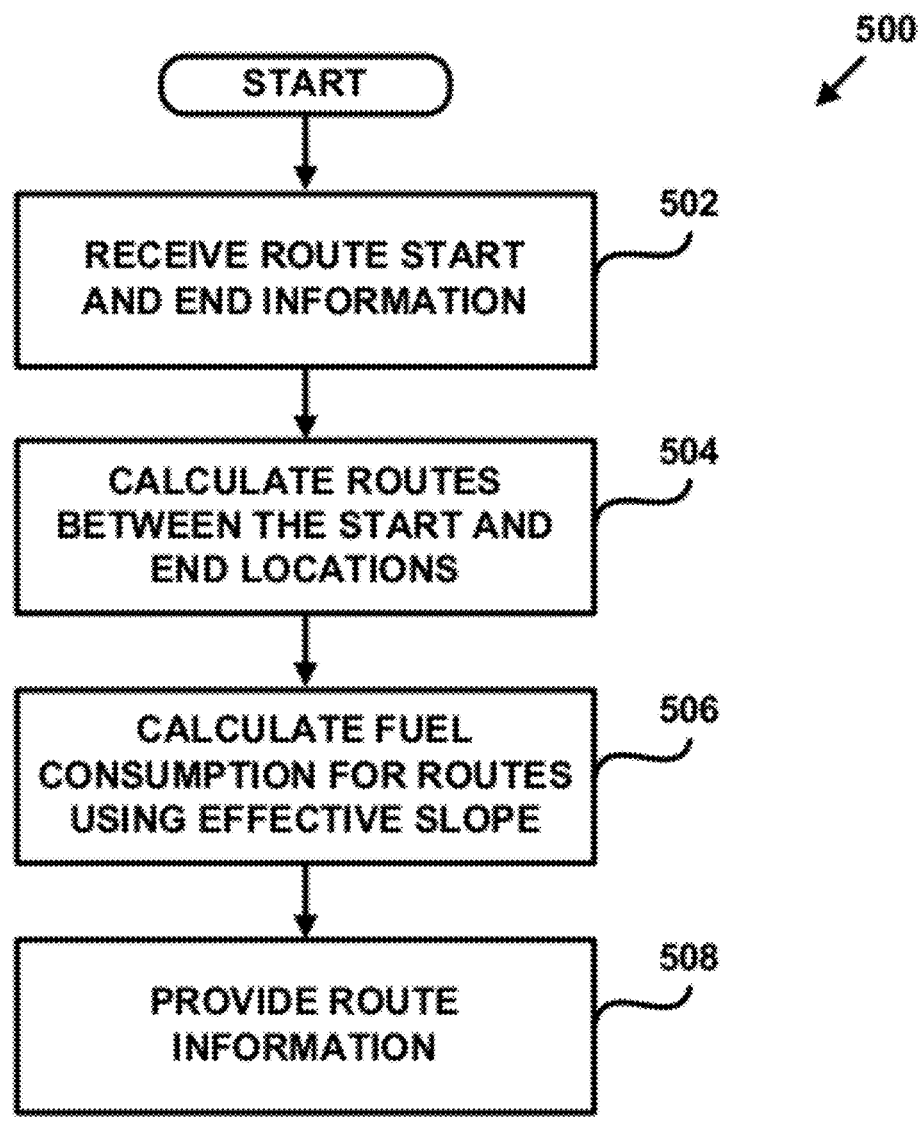
FIG. 5 is a flow chart of a method for calculating a green route, according to an example.

FIG. 5 is a flow chart of a method 500 for calculating a green route. The method 500 dynamically calculates fuel consumption using data in the geographic database 26. However, it is understood that a cost per link may be calculated and stored as an attribute in the geographic database 26.

At block 502, the navigation system 10 receives information regarding an origin and a destination. A user of the navigation system 10 may enter the origin and the destination using the user interface 24. Alternatively, the navigation system 10 may use its current position from the positioning system 22 as the origin. In this example, the positioning application 40 performs map matching to determine what road segment represents the navigation system's position on the road network.

At block 504, the route calculation application 34 identifies one or more routes for traveling from the origin to the destination. For each of the routes, the route calculation application 34 retrieves attribute data for the segments that define the routes. The attribute data includes data stored in the effective slope attribute 310. The attribute data may also include road surface type, speed, curvature, and information regarding the location of stop signs, traffic signals, and intersections. The route calculation application 34 may obtain other information that may impact fuel consumption; such has traffic data, weather data, and profile data for the driver and/or the vehicle.

At block 506, the route calculation application 34 calculates a fuel consumption value for each identified route. The route calculation application 34 uses the effective slope value when evaluating the slope contribution to the fuel consumption value. By using the effective slope value, the fuel consumption calculation is easier to perform than using the actual slope value and the results are more accurate than using an average slope value. The route calculation application 34 then compares the fuel consumption values for the different routes.

At block 508, the route calculation application 34 selects the route that minimizes fuel consumption. The route guidance application 36 may provide instructions for traveling on the selected route and the map display application 38 may display the selected route on the user interface 24. Additionally or alternatively, the navigation system 10 may provide the user with a list of routes and the associated fuel consumption so that the user can select a route with knowledge of how their decision will impact their vehicle's fuel consumption.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A computer-implemented method for calculating a green route, comprising:
   obtaining an origin and a destination associated with a road network;
   calculating, by a processor, at least one route from the origin to the destination using geographic data representing roads in the road network, wherein the geographic data includes effective slope data that represents a fuel consumption impact of a slope of a road;
   calculating fuel consumption of the calculated routes using the effective slope data to identify a route that minimizes fuel consumption when traveling from the origin to the destination; and
   providing route guidance for traveling on the route that minimizes fuel consumption,
   wherein the geographic data includes actual slope data for road segments representing a road in the road network, and further comprising calculating a general fuel consumption value for a segment associated with an actual slope value,
wherein the general fuel consumption value is calculated using the formula:

$$GFC = \Sigma(distance'' * LPK(slope'')) / \Sigma(distance'')$$

where distance is a length of the segment, slope is the actual slope value of the segment, and LPK is a lookup table value.

2. The method of claim 1, wherein the lookup table values are determined using clustering.

3. The method of claim 2, wherein the clustering is performed by vehicle type.

4. A computer-implemented method for calculating a green route, comprising:
   obtaining an origin and a destination associated with a road network;
   calculating, by a processor, at least one route from the origin to the destination using geographic data representing roads in the road network, wherein the geographic data includes effective slope data that represents a fuel consumption impact of a slope of a road;
   calculating fuel consumption of the calculated routes using the effective slope data to identify a route that minimizes fuel consumption when traveling from the origin to the destination; and
   providing route guidance for traveling on the route that minimizes fuel consumption, wherein the geographic data includes actual slope data for path segments, and further comprising calculating a general fuel consumption value for a path segment associated with an actual slope value, wherein the general fuel consumption value is calculated using the formula:

$$GFC = \Sigma(distance * LPK(slope)) / \Sigma(distance)$$

where distance is a length of the path segment, slope is the actual slope value of the path segment, and LPK is a lookup table value.

5. A computer-implemented method for calculating a green route, comprising:
   obtaining an origin and a destination associated with a road network;
   calculating, by a processor, at least one route from the origin to the destination using geographic data representing roads in the road network, wherein the geographic data includes an effective slope that represents a fuel consumption impact of changing slopes of a road;
   wherein the effective slope is calculated using a first slope for a first portion of the road and a second slope for a second portion of the road, and the effective slope is different than the first slope, the second slope and an average of the first slope and a second slope;
   calculating fuel consumption of the calculated routes using the effective slope to identify a route that minimizes fuel consumption when traveling from the origin to the destination; and
   providing route guidance for traveling on the route that minimizes fuel consumption.

6. The method of claim 1, wherein the effective slope is obtained from a table that associates effective slope values with fuel consumption values.

7. The method of claim 6, wherein the fuel consumption values are obtained by clustering.

8. The method of claim 1, wherein the geographic data includes road type and calculating fuel consumption includes using the road type data.

9. The method of claim 1, wherein the geographic data includes speed data and calculating fuel consumption includes using the speed data.

10. The method of claim 1, further comprising obtaining traffic data, wherein calculating fuel consumption includes using the traffic data.

11. The method of claim 1, further comprising obtaining weather data, where calculating fuel consumption includes using the weather data.

12. The method of claim 1, further comprising obtaining profile data, wherein calculating fuel consumption includes using the profile data.

13. The method of claim 1, wherein the effective slope is determined by calculating a general fuel consumption value as a function of a lookup table value for the first slope for the first portion of the road, a distance for the first portion of the road, a lookup table value for the second slope for the second portion of the road, and a distance for the second portion of the road.

14. A navigation system that provides green routing comprising:
   a user interface that allows a user to request route information from a first location to a second location;
   a map database that includes geographic data for a geographic area that includes the first and second locations, wherein the map database includes an effective slope that represents a fuel consumption impact of actual slope according to vehicle types;
   wherein the effective slope is calculated using at least two slopes, and the effective slope is different than an average of the at least two slopes; and
   a processor that executes a route calculation application that calculates a first route for a first vehicle type and calculates a second route for a second vehicle type that minimizes fuel consumption when traveling from the first location to the second location, wherein the route is calculated using the effective slope.

15. The system of claim 14, wherein the effective slope is obtained from a table that associates effective slope values with fuel consumption values.

16. The system of claim 15, wherein the table values are obtained by clustering by vehicle type.

17. The system of claim 14, wherein the processor uses a route guidance application to provide route guidance for traveling on the route.

18. The system of claim 14, wherein the processor uses a map display application to display a map of the route.

19. A map database having data to facilitate the calculation of a green route comprising:
   speed category data that represents speed associated with a road segment;
   road type data that represents functional class associated with the road segment;
   segment characteristic data that represents physical characteristics associated with the road segment;
   vehicle type data that associates categories of vehicles to a factor; and
   effective slope that represents a slope's contribution to fuel consumption when traveling on the road segment;
   wherein the effective slope is calculated using a first slope and a second slope, and the effective slope is different than the first slope, different than the second slope and different than an average of the first slope and the second slope;
   wherein a route guidance application uses the speed category data, the road type data, the segment characteristic data, the vehicle type data, and the effective slope to calculate a route that minimizes fuel consumption.

20. The map database of claim 19, wherein the segment characteristic data represents curvature of the road segment.

21. The map database of claim 19, wherein the segment characteristic data represents road surface type.

* * * * *

UNITED STATES PATENT AND TRADEMARK OFFICE
CERTIFICATE OF CORRECTION

PATENT NO.          : 8,880,333 B2                                Page 1 of 1
APPLICATION NO.     : 12/917770
DATED               : November 4, 2014
INVENTOR(S)         : Andrew Calkins It is certified that error appears in the above-identified patent and that said Letters Patent is hereby corrected as shown below:

In the claims:
Column 8
claim 6, line 20, "claim 1" should be replaced with -- claim 5 --.
Column 8
claim 8, line 25, "claim 1" should be replaced with -- claim 5 --.
Column 8
claim 9, line 28, "claim 1" should be replaced with -- claim 5 --.
Column 8
claim 10, line 31, "claim 1" should be replaced with -- claim 5 --.
Column 8
claim 11, line 34, "claim 1" should be replaced with -- claim 5 --.
Column 8
claim 12, line 37, "claim 1" should be replaced with -- claim 5 --.
Column 8
claim 13, line 40, "claim 1" should be replaced with -- claim 5--.

Signed and Sealed this
Twenty-fourth Day of March, 2015

Michelle K. Lee
*Director of the United States Patent and Trademark Office*